(12) United States Patent
Xue

(10) Patent No.: US 6,973,221 B1
(45) Date of Patent: Dec. 6, 2005

(54) METHOD AND APPARATUS FOR REDUCING BLOCK RELATED ARTIFACTS IN VIDEO

(75) Inventor: Ning Xue, Fremont, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/460,965

(22) Filed: Dec. 14, 1999

(51) Int. Cl.$^7$ ............................................... G06T 5/00
(52) U.S. Cl. ..................................................... 382/268
(58) Field of Search ........................................ 382/268

(56) References Cited

U.S. PATENT DOCUMENTS

| | | | | |
|---|---|---|---|---|
| 4,941,043 A | * | 7/1990 | Jass | 375/240.2 |
| 5,475,434 A | * | 12/1995 | Kim | 375/240.24 |
| 5,625,714 A | * | 4/1997 | Fukuda | 382/233 |
| 6,167,164 A | * | 12/2000 | Lee | 382/261 |
| 6,529,638 B1 | * | 3/2003 | Westerman | 382/275 |
| 6,563,958 B1 | * | 5/2003 | Andrew | 382/268 |

OTHER PUBLICATIONS

Y. L. Lee et al., Blocking Effect Reduction of JPEG Images by Signal Adaptive Filtering, IEEE Transactions on Image Processing, vol. 7, No. 2, Feb. 1998, pp. 229-234.*

Hu et al., Removal of Blocking and Ringing Artifacts in Transform Coded Images, IEEE, 1997, pp. 2565-2568.*

Yuk-Hee Chan et al., A Practical Postprocessing Technique for Real-Time Block-Based Coding System, IEEE Transactions on Circuits and Systems for Video Technology, vol. 8, No. 1, Feb. 1998, pp. 4-8.*

* cited by examiner

Primary Examiner—Brian Werner
(74) Attorney, Agent, or Firm—Suiter•West•Swantz PC LLO

(57) ABSTRACT

A method and apparatus for reducing block related artifacts in video are disclosed. A boundary is defined in a video frame between at least two or more sub-blocks where each of the sub-blocks contains a predetermined number of pixels. Pixels adjacent to the boundaries of the sub-blocks may be filtered to reduce blocking artifacts in the video. Pixel video values such as luma and chroma values may be utilized as input values to an anti-block filter. Average mean and average variance of the pixel video values in a sub-block are used to determined when anti-block filtering is applied. Pixels adjacent to the sub-block boundaries are filtered with an anti-block filtering algorithm in the event a predetermined condition is satisfied where the condition may be based upon the calculated average mean and average variance values. The filtering algorithm may include recalculating a pixel video value for pixels adjacent the sub-block boundaries. The invention may be utilized, for example, in converting MPEG-1 video to MPEG-2, and may be used in video devices such as VCD or DVD players, camcorders, etc. It is emphasized that this abstract is provided to comply with the rules requiring an abstract that will allow a searcher or other researcher to quickly ascertain the subject matter of the technical disclosure. It is submitted with the understanding that it will not be used to interpret or limit the scope or meaning of the claims.

23 Claims, 7 Drawing Sheets

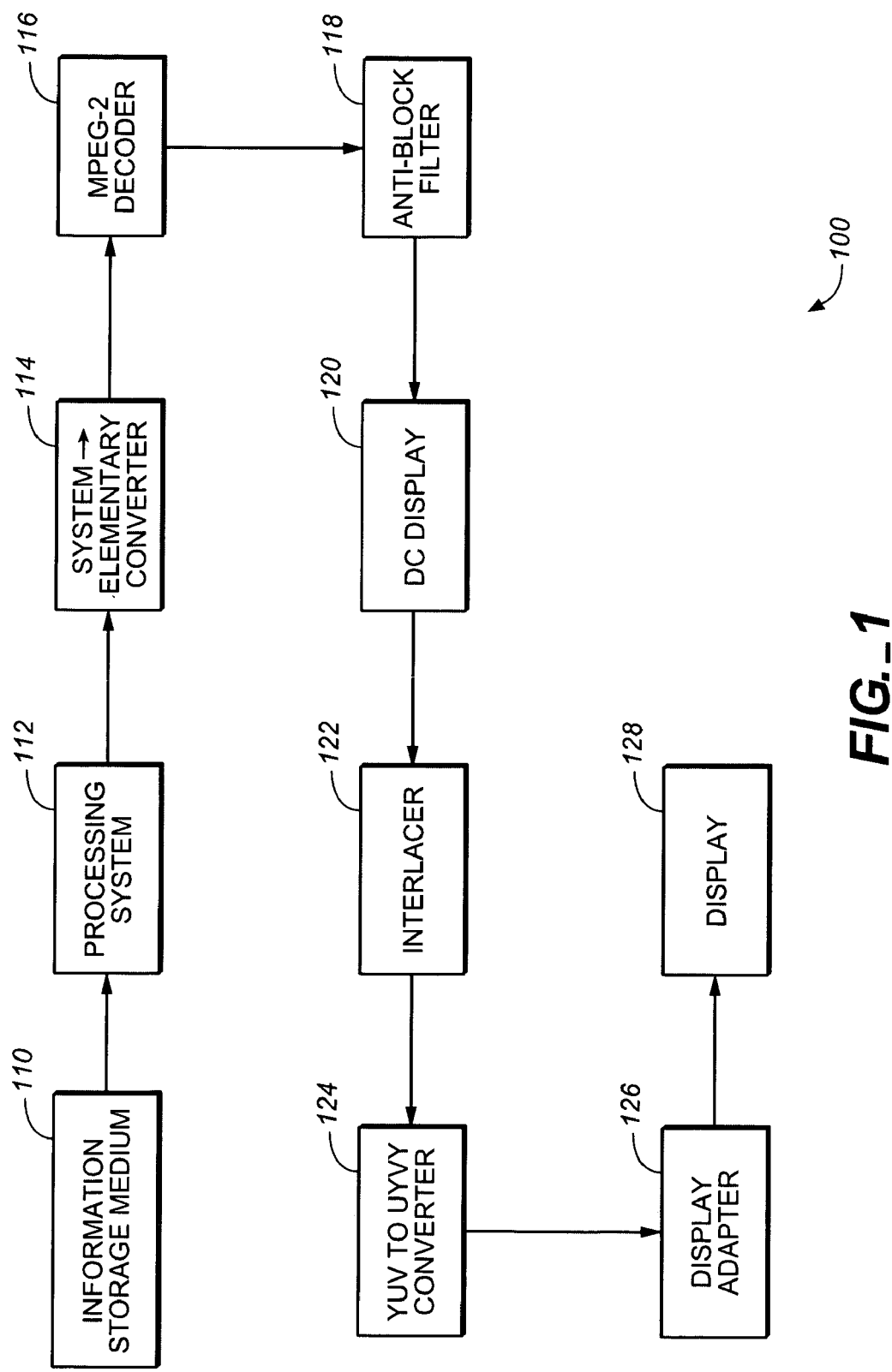
FIG._1

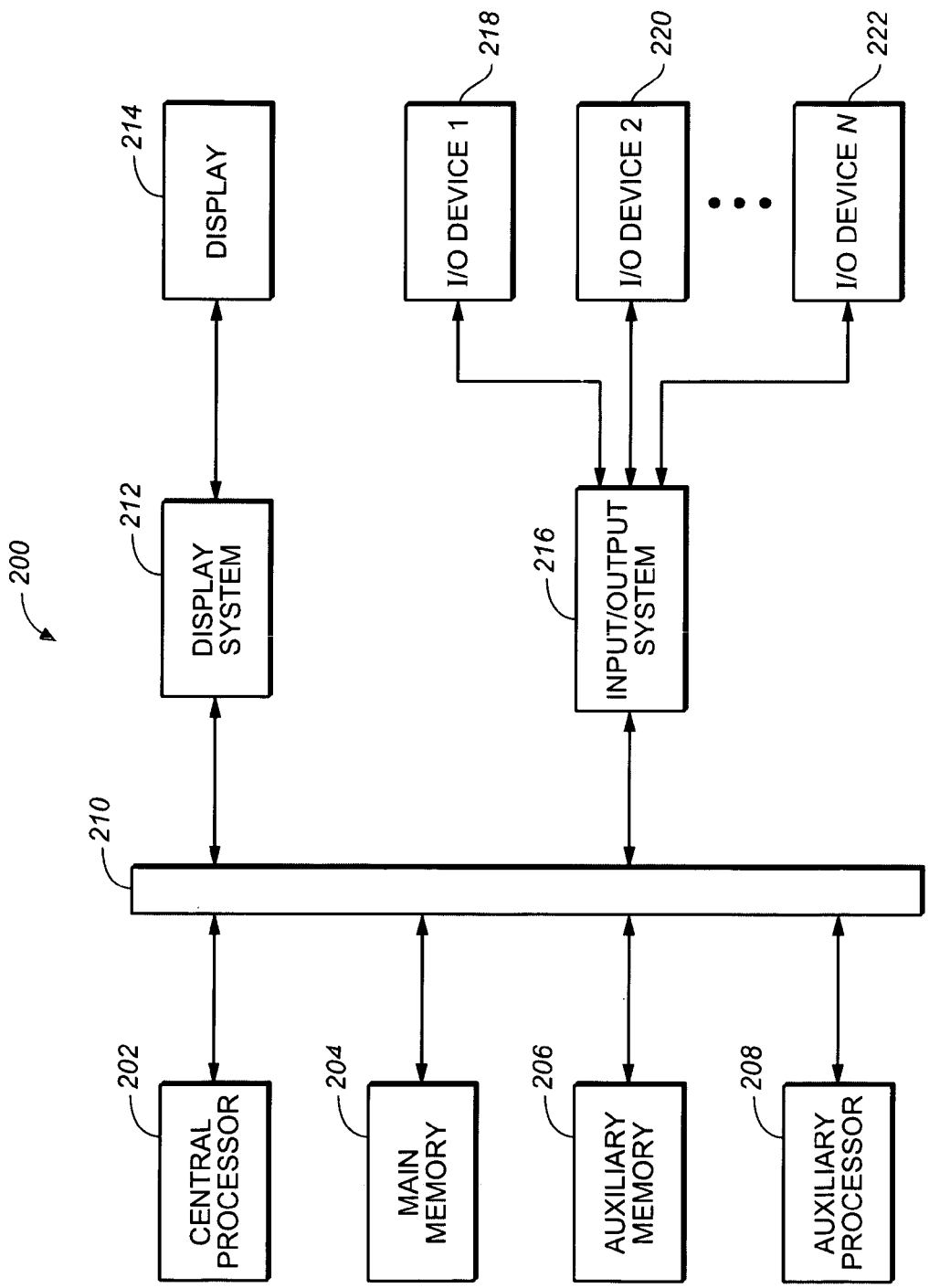
FIG._2

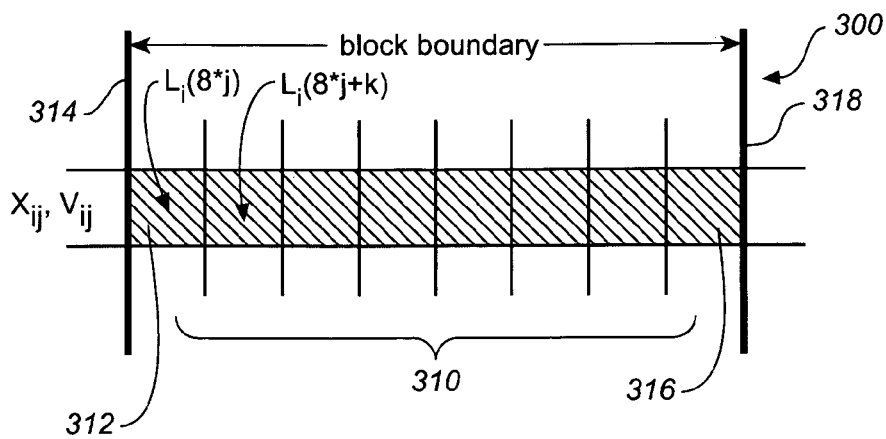
FIG._3
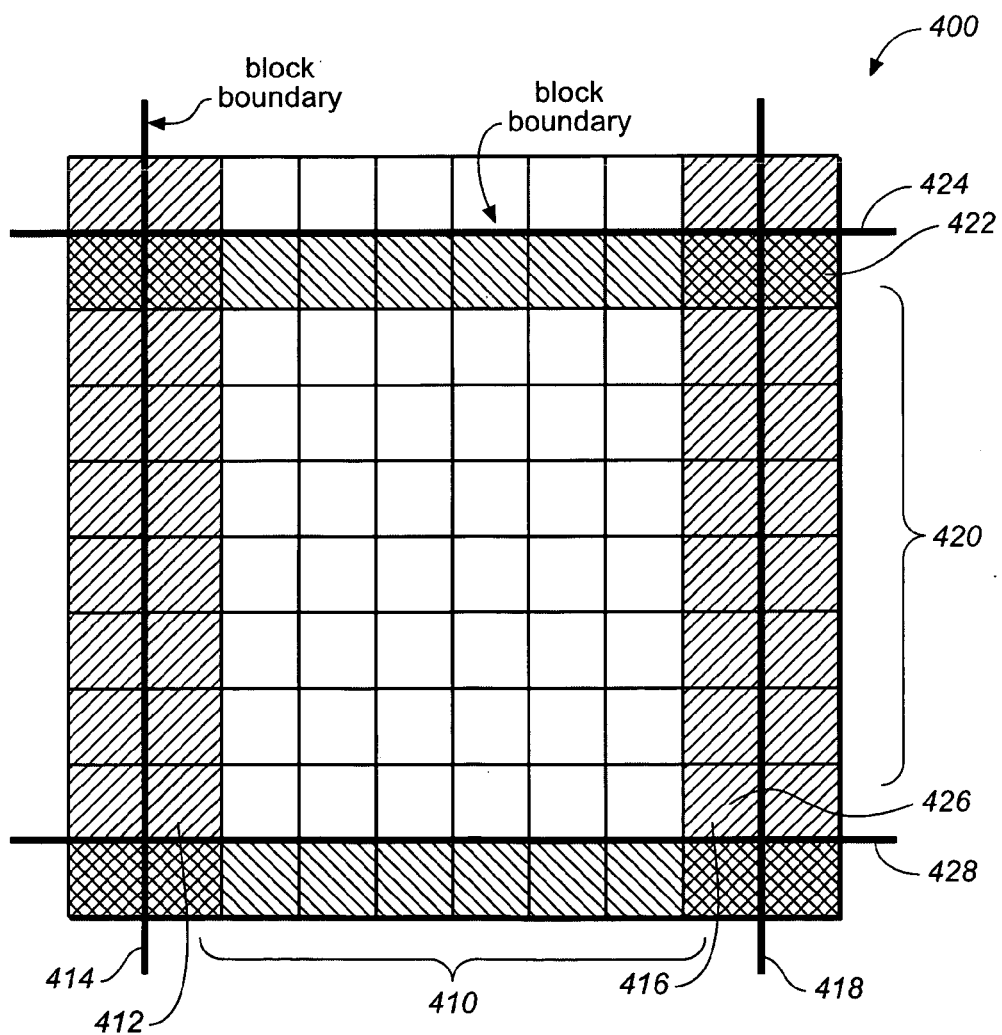
FIG._4

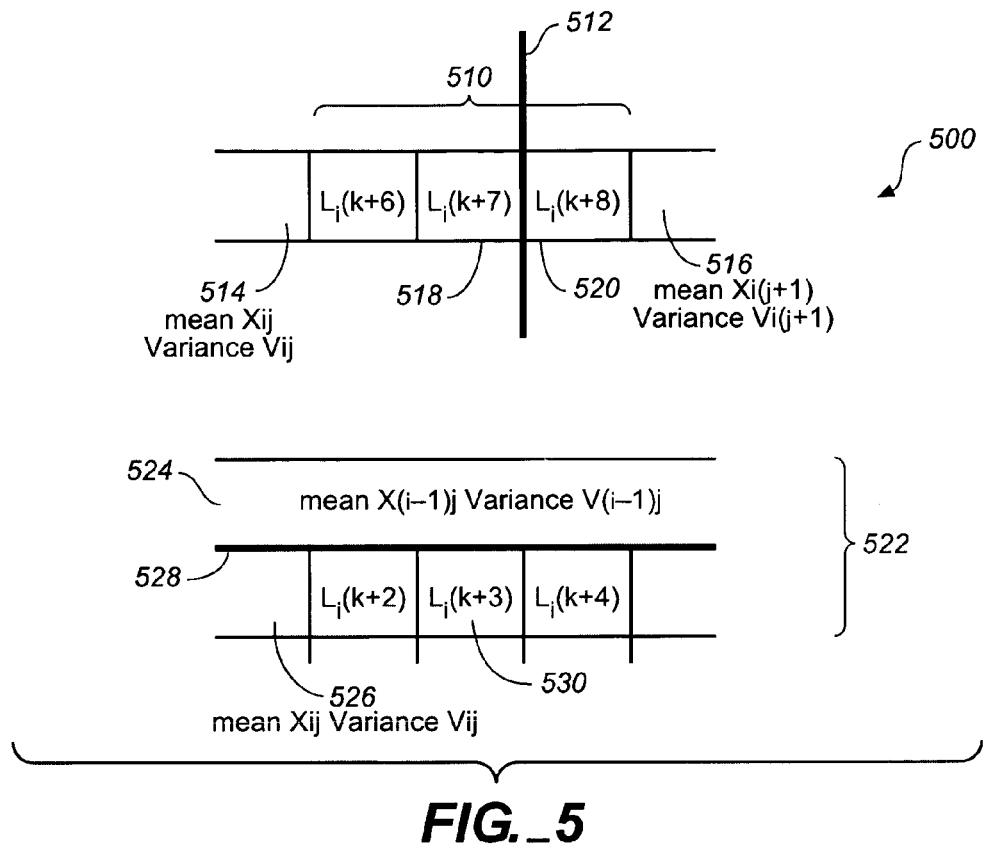
FIG._5
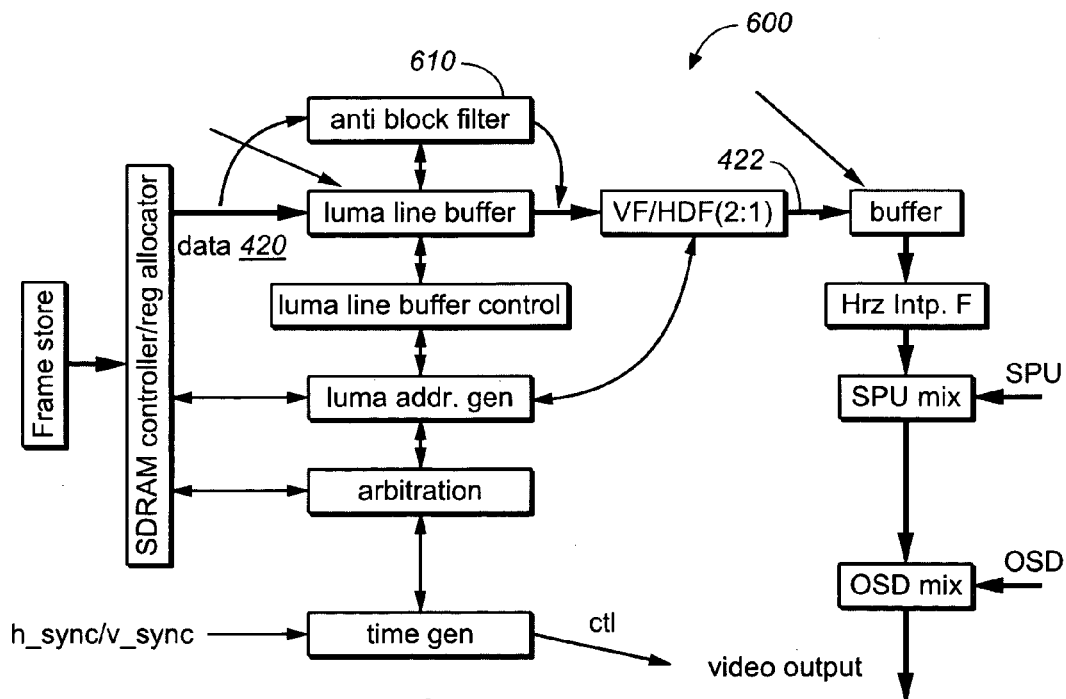
FIG._6

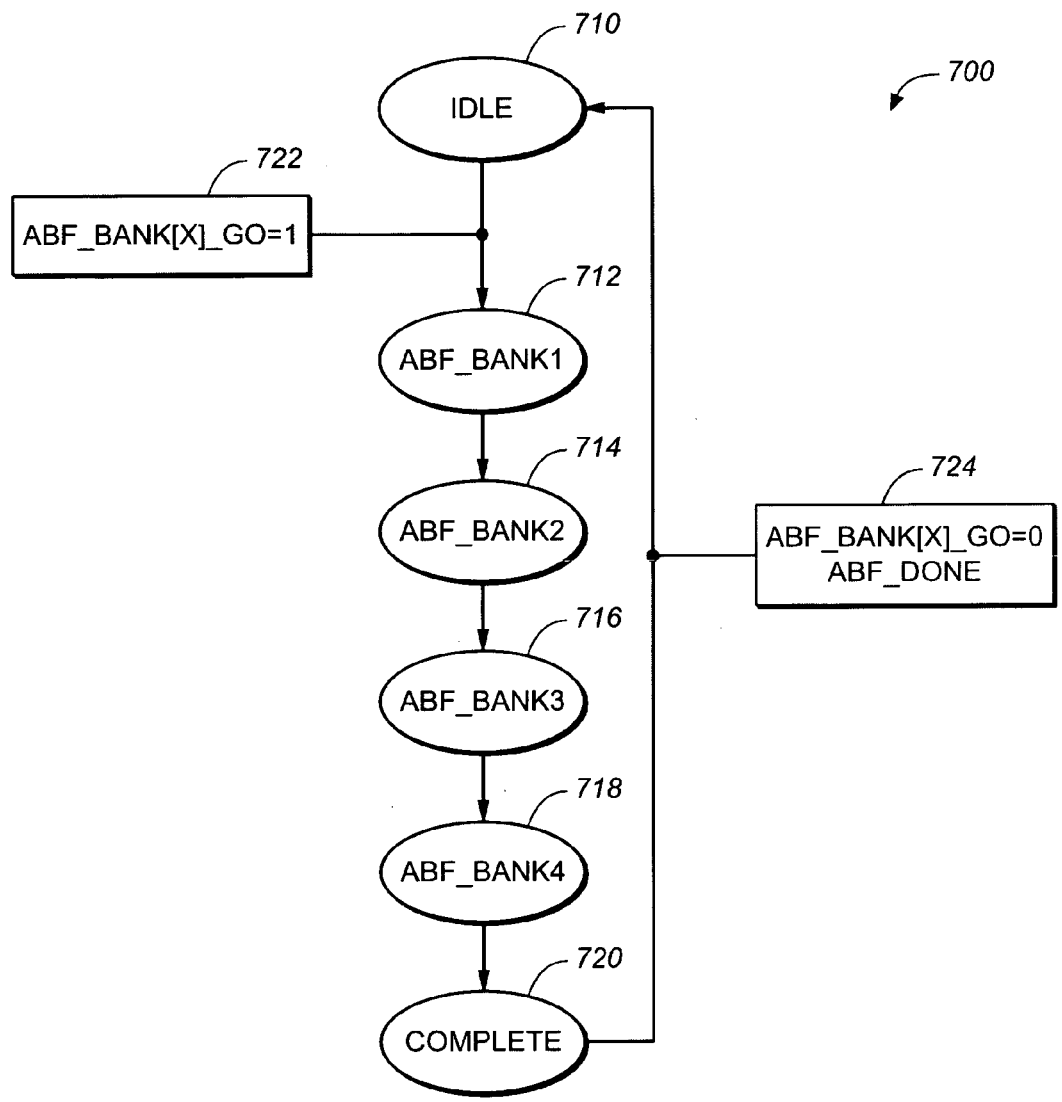
FIG._7

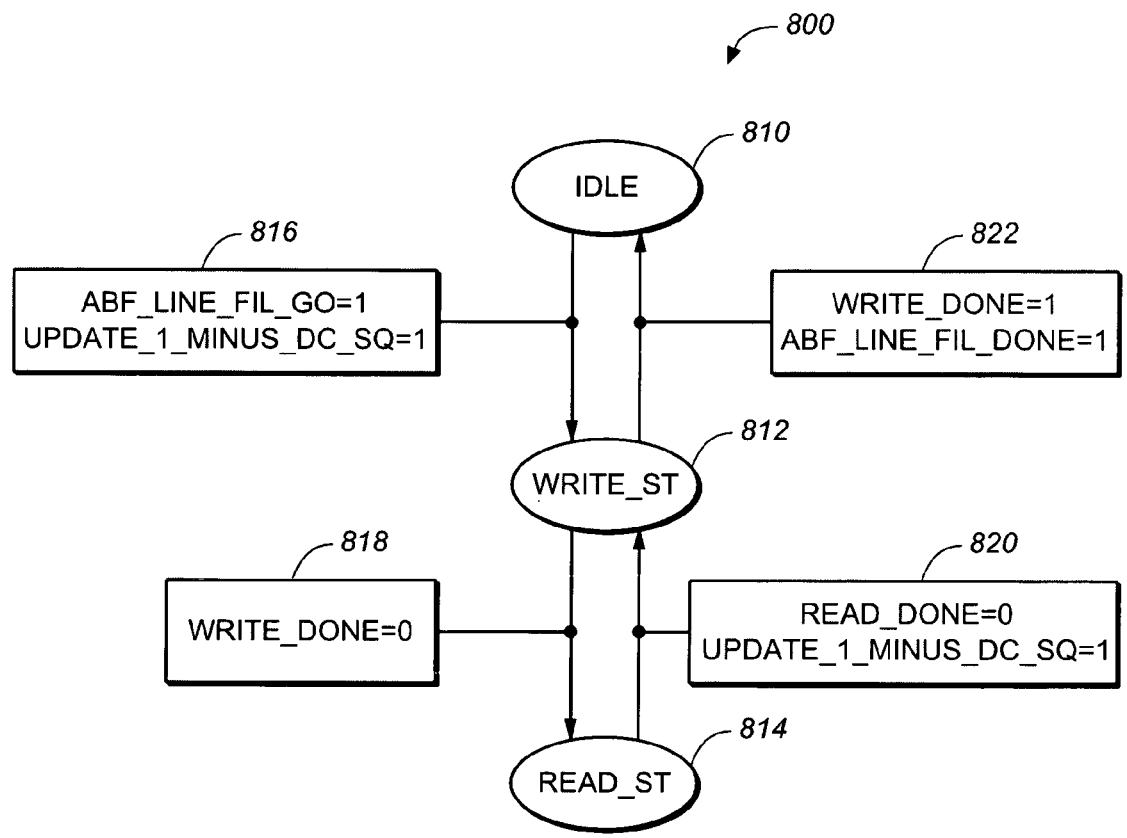
FIG._8

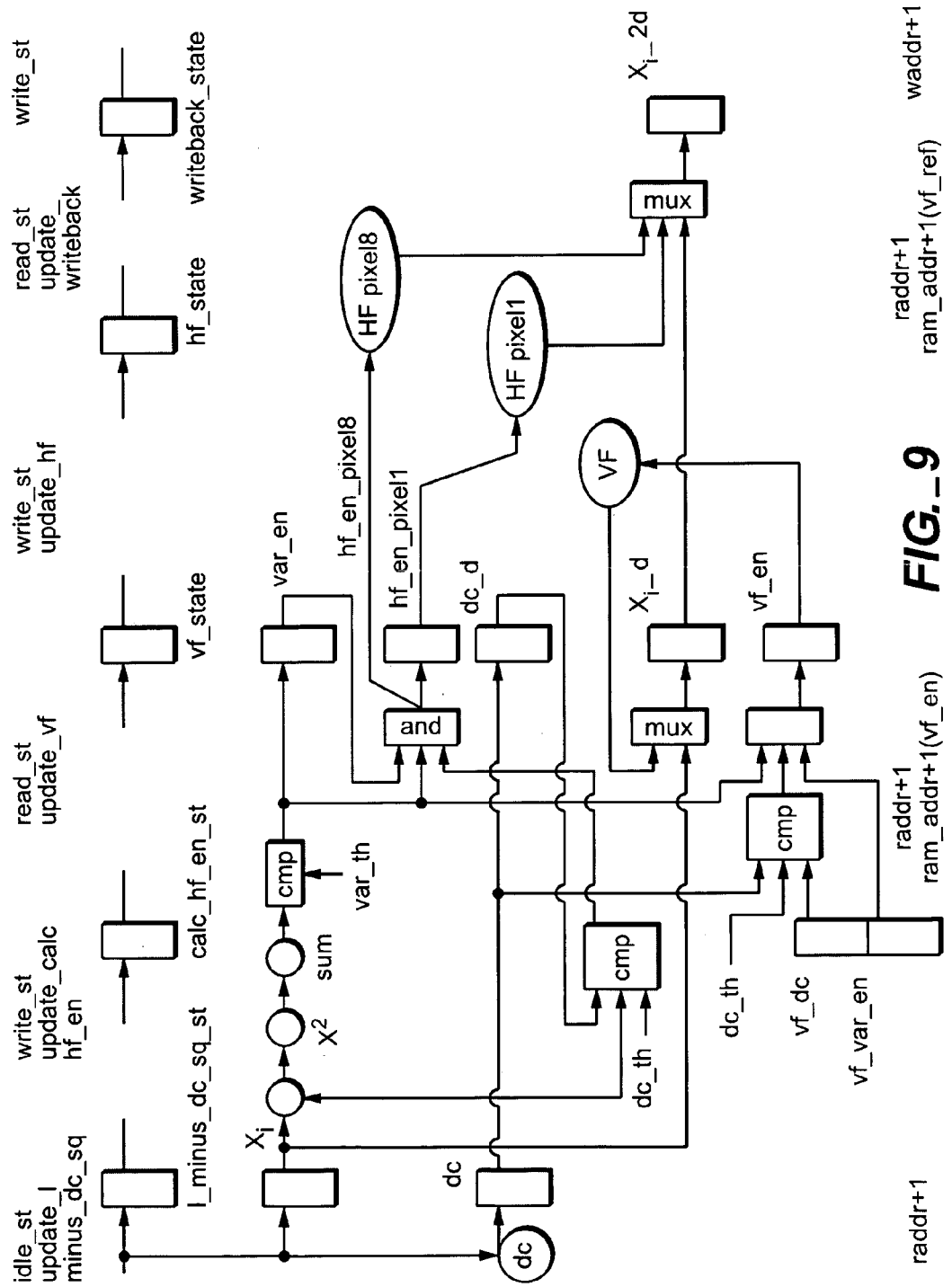
FIG._9

METHOD AND APPARATUS FOR REDUCING BLOCK RELATED ARTIFACTS IN VIDEO

BACKGROUND

To encode a video signal, for example a video signal compliant with a Moving Pictures Expert Group (MPEG) standard bit stream, the whole picture is sliced into small micro-blocks which are transformed into the frequency domain and then quantized. The encoding procedures may be implemented by a hardware or software encoder. Some encoders are run in real-time and as a result are constrained by their bandwidth. That is, the encoder, whether a hardware decoder or a software encoder implemented on hardware such as a central processing unit (CPU) of a general purpose computer, can only encode a finite number of bits. The number of bits that an encoder is capable of encoding is limited by the hardware itself. When the encoded video source contains quick motion, or too little bandwidth is allocated to the left image because of bad bandwidth allocation, or where the hardware is utilized in a portable device with a limited power supply and the encoder is constrained to run at less than full or optimum speed to minimize power consumption, the encoder may allocate a lower bandwidth on bits representing flat regions having no motion containing background blocks. Usually, the direct-current (DC) value has more priority in bandwidth allocation compared to higher frequency bits, but if the left bandwidth is insufficient, the DC quantization in the flat region or background blocks may be encoded harshly. As a result, the decoder cannot reconstruct the DC values satisfactorily.

Allocation of bandwidth is typically dynamic and varies from block to block. A flat region usually covers a larger region on the display that may be, for example, one-quarter the size of the display area. If among these many flat micro-blocks some DC values are quantized well while others are not, the whole reconstructed picture appears blocky. This is a typical result with video compact disc (VCD) images because VCD bandwidth is less than the bandwidth of MPEG2 video. Real-time encoded MPEG2 video on video devices such as camcorders or with home shopping systems also have the same blocky appearing micro-blocks because the encoder must run at the real speed to process all the images. Thus, there lies a need for a method and system for reducing the harsh DC quantization impact in video reconstruction.

BRIEF DESCRIPTION OF THE DRAWINGS

The numerous advantages of the present invention may be better understood by those skilled in the art by reference to the accompanying figures in which:

FIG. 1 is a block diagram of a video system in accordance with the present invention;

FIG. 2 is a block diagram of a computer system operable to embody at least one or more implementations of the present invention;

FIG. 3 is a diagram of a block partition of a portion of a video frame in accordance with the present invention;

FIG. 4 is a diagram of a vertical and horizontal partition of a portion of a video frame in accordance with the present invention;

FIG. 5 is a diagram showing regions of filtering applied to block boundaries in accordance with the present invention;

FIG. 6 is a block diagram of a display controller in accordance with the present invention;

FIG. 7 is a control state machine diagram for an anti-block noise filter in accordance with the present invention;

FIG. 8 is a data path state machine diagram for an anti-block noise filter in accordance with the present invention; and FIG. 9 is an anti-block noise filter data path in accordance with the present invention.

DETAILED DESCRIPTION

Reference will now be made in detail to at least one or more embodiments of the invention, an example of which is illustrated in the accompanying drawings.

Referring now to FIG. 1, a video system in accordance with the present invention will be discussed. Video system 100 is capable of reading information stored on an information storage medium 110, and receiving and processing the information as an input signal to processing system 112. In one embodiment, information storage medium 110 is capable of storing information in accordance with a known video standard and may be, for example, in the form of a video compact disc (VCD), digital video disc (DVD) or the like type of information storage medium. In one embodiment, the video information is encoded on information storage medium in compliance with a Moving Pictures Experts Group (MPEG) standard. In a typical VCD, for example, the video information may be encoded in accordance with an MPEG-1 standard, an MPEG standard designed for storing noninterlaced video and audio on a compact disc information storage medium. Processing system 112 reads information stored on information storage medium 110 as a system programmed bit stream and provides the bit stream as an output to a system to elementary converter 114. System to elementary converter 114 converts the MPEG-1 programmed bit stream received from processing system 112 to an MPEG-1 elementary bit stream, which is in turn provided to MPEG-2 decoder 115. MPEG-2 decoder decodes the MPEG-1 elementary bit stream into an MPEG-2 standard compliant signal where an MPEG-2 standard is defined as an extension of the MPEG-1 standard. An MPEG-2 standard compliant signal is optimized particularly for broadcast television including high definition television (HDTV). In contrast to MPEG-1, MPEG-2 provides interlaced video and provides a wider range of frame sizes. In one embodiment, for example, MPEG-2 decoder 116 provides a 352 by 240 pixel video frame size when information storage medium 110 is a typical VCD having MPEG-1 compliant video. In a particular embodiment, the video output signal of MPEG-2 decoder is encoded in a (YUV) type video format. The output of MPEG-2 decoder 116 is provided to an anti-block filter 124 which filters blocking present in the video output in accordance with the present invention. The output of anti-block filter 124 is then provided to DC display encoder 120 which converts the video frame into two fields each comprising a 240 by 720 pixel frame per field. The vide frames are then provided to interlacer 122 for providing an interlaced video signal output in a 720 by 480 YUV format to YUV to UYVY converter 124. YUV to UYVY converter 124 converts the video signal to a 720 by 480 pixel UYVY formatted video signal that is provided to display adapter 126. Display adapter 126 provides the video output signal to display 128 such that information stored on information storage medium 110 is displayed on display 128 as video. Although at least one or more embodiments of system 100 are discussed with respect to FIG. 1, one having skill in the art would recognize, upon reviewing the disclosure herein, that additional or alternative embodiments may be implemented, and at least one or more equivalent components thereof may be substituted, without providing substantial change to the function or structure of system 100 or to the scope of the present invention.

Referring now to FIG. 2, a hardware system in accordance with the present invention is shown. The hardware system shown in FIG. 2 is generally representative of the hardware architecture of a computer system embodiment of the present invention. Computer system 200 may be configured to implement any one or more of the elements 110–128 of system 100 of FIG. 1, individually or in combination, for example, by implementing processing system 112, system to elementary converter 114, MPEG-2 decoder 116, etc. A central processor 202 controls the computer system 200. Central processor 202 includes a central processing unit such as a microprocessor or microcontroller for executing programs, performing data manipulations and controlling the tasks of computer system 200. Communication with central processor 202 is implemented through a system bus 210 for transferring information among the components of computer system 200. Bus 210 may include a data channel for facilitating information transfer between storage and other peripheral components of computer system 200. Bus 210 further provides the set of signals required for communication with central processor 202 including a data bus, address bus, and control bus. Bus 210 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Furthermore, bus 210 may be compliant with any promulgated industry standard. For example, bus 210 may be designed in compliance with any of the following bus architectures: Industry Standard Architecture (ISA), Extended Industry Standard Architecture (EISA), Micro Channel Architecture, Peripheral Component Interconnect (PCI), Universal Serial Bus (USB), Access.bus, IEEE P1394, Apple Desktop Bus (ADB), Concentration Highway Interface (CHI), Fire Wire, Geo Port, or Small Computer Systems Interface (SCSI), for example.

Other components of computer system 200 include main memory 204, auxiliary memory 206, and an auxiliary processor 208 as required. Main memory 204 provides storage of instructions and data for programs executing on central processor 202. Main memory 204 is typically semiconductor based memory such as dynamic random access memory (DRAM) and or static random access memory (SRAM). Auxiliary memory 206 provides storage of instructions and data that are loaded into the main memory 204 before execution. Auxiliary memory 206 may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM). Auxiliary memory 206 may also include a variety of non-semiconductor based memories, including but not limited to magnetic tape, drum, floppy disk, hard disk, optical, laser disk, compact disc read-only memory (CD-ROM), digital versatile disk read-only memory (DVD-ROM), digital versatile disk random-access memory (DVD-RAM), etc. Other varieties of memory devices are contemplated as well. Computer system 200 may optionally include an auxiliary processor 208 which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

Computer system 200 further includes a display system 212 for connecting to a display device 214, and an input/output (I/O) system 216 for connecting to one or more I/O devices 218, 220, up to N number of I/O devices 222. Display system 212 may comprise a video display adapter having all of the components for driving the display device, including video random access memory (VRAM), buffer, and graphics engine as desired. Display device 214 may comprise a cathode ray-tube (CRT) type display such as a monitor or television, or may comprise alternative type of display technologies such as a liquid-crystal display (LCD), a light-emitting diode (LED) display, or a gas or plasma display. Input/output system 216 may comprise one or more controllers or adapters for providing interface functions between one or more of I/O devices 218–222. For example, input/output system 216 may comprise a serial port, parallel port, infrared port, network adapter, printer adapter, radio-frequency (RF) communications adapter, universal asynchronous receiver-transmitter (UART) port, etc., for interfacing between corresponding I/O devices such as a mouse, joystick, trackball, track pad, track stick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electro-acoustic transducer, microphone, speaker, etc. Input/output system 216 and I/O devices 218–222 may provide or receive analog or digital signals for communication between computer system 200 of the present invention and external devices, networks, or information sources. Input/output system 216 and I/O devices 218–222 preferably implement industry promulgated architecture standards, including Recommended Standard 232 (RS-232) promulgated by the Electrical Industries Association, Infrared Data Association (IrDA) standards, Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.11 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of computer system 200 of FIG. 1 by one having ordinary skill in the art would not depart from the scope or the spirit of the present invention.

Referring now to FIG. 3, a sub-block in accordance with the present invention will be discussed. As shown in FIG. 3, a sub-block 300 may be defined as a partition in a video frame of an array of pixels. In the example shown in FIG. 3, sub-block 300 comprises a linear array of pixels 310. As an example, a video frame image composed of an array of 720 by 480 pixels may be partitioned into 90 by 480 sub-blocks wherein each sub-block contains 8 pixels in a row. The first pixel 312 in a row is disposed adjacent to a first sub-block boundary 314, and the eighth pixel 316 is disposed adjacent to a second sub-block boundary 318. In a horizontal sub-block partition, boundaries 314 and 316 are vertically disposed, whereas in a vertical sub-block partition, boundaries 314 and 316 are horizontally disposed. Each one of pixels 310 may have at least one or more corresponding pixel video values such as a luma value or a chroma value.

Referring now to FIG. 4, a sub-block partition in accordance with the present invention will be discussed. Sub-block 400 of FIG. 4 is substantially similar to sub-block 300 as shown in FIG. 3, however sub-block 400 is a predetermined partition of a video frame in both the horizontal and vertical directions. In one example, sub-block is an 8-pixel by 8-pixel partition of a video frame. As in FIG. 3, a first pixel 412 in a row of pixels 410 is disposed adjacent to a first vertical boundary 414, and a last pixel 416 in a row of pixels 410 is disposed adjacent to a second boundary 418. Likewise, a first pixel 422 in a column of pixels 420 is disposed adjacent to a first horizontal boundary 424, and a last pixel 426 in a column of pixels 420 is disposed adjacent to a second horizontal boundary 428. In one embodiment of the present invention, pixels adjacent to vertical boundaries such as vertical boundaries 414 and 418 are filtered according to a horizontal filtering algorithm, and pixels adjacent to horizontal boundaries such as horizontal boundaries 424 and 428 are filtered according to a vertical filtering algorithm.

Referring now to FIG. 5, horizontal and vertical filtering algorithms will be discussed. In a horizontal filtering algorithm, vertical boundary 512 separates a first horizontal sub-block 514 and a second horizontal sub-block 516. At least one pixel video xvalue for the pixels in sub-blocks 514 and 516 are utilized in the horizontal filtering algorithm 510. Using luma values as an example of one or more pixel video values that may be utilized, the luma value of a pixel at coordinate (i,j) is defined as Lij. Xij is defined as the average mean of the pixel video values (e.g., luma values) in a sub-block 514 or 516, and Vij is defined as the average variance. The average mean and the average variance of the pixel video values are calculated for each of sub-blocks 514 and 516. For example, in an 8 pixel block, Xij is equal to one-eight of the summation from k equals zero to k equals 7 of Li(8*j+k). Likewise, Vij equals one-eight the summation from k equals zero to k equals 7 of the square of the difference between Li(8*j+k) and Xij (that is, Li(8*j+k) les Xij). Upon a predetermined condition being satisfied, where the condition may be based upon the calculated average mean and average variance values, pixels 518 and 520 adjacent to vertical boundary 512 are filtered by having their respective pixel video values recalculated. The recalculation a pixel video value for pixel 518, defined for example as Li(k+7) for sub-block 514, may be implemented as being equal to an average of the pixel video value of at least one or more pixels disposed proximal to pixel 518. For example, the recalculated luma value Li(k+7) is equal to one-third the sum of Li(k+6), Li(k+7), and Li(k+8). In one embodiment, pixels disposed adjacent to vertical boundary 512, such as pixels 518 and 520, where existent, are filtered by recalculating a respective pixel video value. In a vertical filtering algorithm 522, Average pixel video values for sub-blocks 524 and 526 of pixels above and below horizontal boundary 528, respectively are calculated in a corresponding manner as the calculation of average pixel video values in horizontal filtering algorithm 510. Upon satisfaction of a predetermined condition, where the condition may be based upon the calculated average mean and average variance values, pixels adjacent to horizontal boundary 528 are filtered by having a pixel video value recalculated. In one embodiment, pixels below and adjacent to horizontal boundary 528 are vertically filtered. A recalculated luma value for pixel 530 may be set as equal to one-half the sum of $X(i-1)j$ and $Li(k+3)$. In one embodiment, for variance calculations, the variance values may be approximated. In a particular embodiment, a variance values are approximated using a piece-wise linear estimate. For example, in an approximation $X^2$ may be, where X is represented as a digital value, where X is $X_7X_6X_5X_4X_3X_2X_1X_0$, $X_2$ may be approximated as $X_70X_60X_50X_40X_30X_20X_10X_00$. For negative values of X, X may be converted to a positive value and then approximated, or padded with 1's and then the absolute value of X may be taken. For larger values of X, $X^2$ may be ignored as assumed to be out of threshold.

Referring now to FIG. 6, a display controller for a video system in accordance with the present invention will be discussed. Display controller 600 is capable of implementing an anti-block filter 610 as a component thereof in the processing of video. Anti-block filter 610 is thereby capable of implementing horizontal filtering algorithm 510, vertical filtering algorithm 522, or a combination thereof. Further, anti-block filter 610 is capable of performing filtering calculations using one or more pixel video values, including luma or chroma, for example.

Referring now to FIG. 7, an anti-block noise filter control state machine in accordance with the present invention will be discussed. State machine 700 describes the flow of filter bank transitions for anti-block filter 118 or 610, for example. Initially, the filter is in an idle state 710. Upon a predetermined condition 722 being satisfied, transitions are made in succession to filter bank states 712–718. The condition may be based upon the calculated average mean and average variance values. Upon completion of filtering, a transition is made to a complete state 720. A transition is made to idle state 710 based on conditions 724.

Referring now to FIG. 8, an anti-block noise filter data path state machine will be discussed. An anti-block noise filter data path is shown in FIG. 9. State machine 800 includes an idle state 810. A transition is made from idle state 810 to a write state 812 upon satisfaction of condition 816. A transition is made from write state 812 to read state upon satisfaction of condition 818. A transition is made from read state 814 to write state 812 upon satisfaction of condition 820. A transition is made from write state 812 to idle state 810 upon satisfaction of condition 822. The conditions 816–822 may be based upon the calculated average mean and average variance values.

Thus, in accordance with the present invention, blocky artifacts are removed from video images to ensure that the flat background is not blocky during normal speed display and to maintain a higher quality of slower speed and freeze playback. The user is capable of controlling filtering encoding qualities via programming host registers. Luma anti-block filtering and chroma anti-block filtering can be enabled or disabled separately. Thus, in one embodiment, block boundaries are filtered. In encoding, motion blocks may be allocated more bandwidth than background blocks. In one embodiment of the invention, blocky artifacts in the flat region of the video are filtered. A flat block is detected by determining the variance of the block as described herein. Thus, one or more flat regions of the video are filtered, and such filtering is thereby flatness triggered filtering.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 204 of one or more computer systems configured generally as described in FIG. 2. Until required by the computer system, the set of instructions may be stored in another computer readable memory such as auxiliary memory 206 of FIG. 2, for example in a hard disk drive or in a removable memory such as an optical disk for utilization in a CD-ROM drive, a floppy disk for utilization in a floppy disk drive, a combination floppy and optical disk for utilization in a floppy/optical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet (a program executed from within another application) or a servlet (an applet executed by a server) that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the method and apparatus for reducing block related artifacts in video of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method, comprising:
   partitioning an image into at least two or more sub-blocks, each of the at least two or more sub-blocks containing a predetermined number of pixels wherein at least one boundary between the at least two or more sub-blocks is defined, each of the pixels having a pixel video value, respectively
   determining whether a predetermined condition is satisfied, wherein the predetermined condition is based upon calculating average mean and average variance values of said two or more sub-blocks; and,
   upon satisfaction of the predetermined condition, at least for a first pixel disposed proximal to the boundary, recalculating the pixel video value for the first pixel, said recalculating step being based at least upon the pixel video value of a second pixel being disposed proximal to the first pixel;
   wherein the average variance values are approximated using a piece-wise linear estimate.

2. A method as claimed in claim 1, further comprising the step of calculating an average mean of the pixel video values for the respective pixels of each of the at least two or more sub-blocks, said determining step being based upon at least a result of said average mean calculating step.

3. A method as claimed in claim 1, further comprising the step of calculating an average variance of the pixel video values for the respective pixels of each of the at least two or more sub-blocks, said determining step being based upon at least a result of said average variance calculating step.

4. A method as claimed in claim 1, further comprising the step of calculating an average variance and an average mean of the pixel video values for the respective pixels of each of the at least two or more sub-blocks, said determining step being based upon at least a result of said average variance and average mean calculating step.

5. A method as claimed in claim 1, the second pixel being disposed in a different sub-block from the first pixel.

6. A method as claimed in claim 1, said recalculating step being based upon a first algorithm in the event the boundary has a first slope and being based upon a second algorithm in the event the boundary has a second slope.

7. A method as claimed in claim 1, said recalculating step being implemented upon each of the predetermined number of pixels in each of the at least two or more sub-blocks adjacent to the boundary.

8. A method as in claim 1 wherein the piece-wise linear estimate involves converting negative variance values to positive variance values and utilizing the positive variance values to calculate average variance values.

9. A program of instructions capable of being stored on a computer readable medium for causing a computer to implement steps for filtering a video, the steps comprising:
   partitioning an image into at least two or more sub-blocks, each of the at least two or more sub-blocks containing a predetermined number of pixels wherein at least one boundary between the at least two or more sub-blocks is defined, each of the pixels having a pixel video value, respectively
   determining whether a predetermined condition is satisfied, wherein the predetermined condition is based upon calculating average mean and average variance values of said two or more sub-blocks; and,
   upon satisfaction of the predetermined condition, at least for a first pixel disposed proximal to the boundary, recalculating the pixel video value for the first pixel, said recalculating step being based at least upon the pixel video value of a second pixel being disposed proximal to the first pixel;
   wherein the average variance values are approximated using a piece-wise linear estimate.

10. A program of instructions as claimed in claim 9, further comprising the step of calculating an average mean of the pixel video values for the respective pixels of each of the at least two or more sub-blocks, said determining step being based upon at least a result of said average mean calculating step.

11. A program of instructions as claimed in claim 9, further comprising the step of calculating an average variance of the pixel video values for the respective pixels of each of the at least two or more sub-blocks, said determining step being based upon at least a result of said average variance calculating step.

12. A program of instructions as claimed in claim 9, further comprising the step of calculating an average variance and an average mean of the pixel video values for the respective pixels of each of the at least two or more sub-blocks, said determining step being based upon at least a result of said average variance and average mean calculating step.

13. A program of instructions as claimed in claim 9, the second pixel being disposed in a different sub-block from the first pixel.

14. A program of instructions as claimed in claim 9, said recalculating step being based upon a first algorithm in the event the boundary has a first slope and being based upon a second algorithm in the event the boundary has a second slope.

15. A program of instructions as claimed in claim 9, said recalculating step being implemented upon each of the predetermined number of pixels adjacent to the boundary in each of the at least two or more sub-blocks.

16. A program of instructions as claimed in claim 9 wherein the piece-wise linear estimate involves converting negative variance values to positive variance values and utilizing the positive variance values to calculate average variance values.

17. An apparatus, comprising:
  means for partitioning an image into at least two or more sub-blocks, each of the at least two or more sub-blocks containing a predetermined number of pixels wherein at least one boundary between the at least two or more sub-blocks is defined, each of the pixels having a pixel video value, respectively;
  means for determining whether a predetermined condition is satisfied, wherein the predetermined condition is based upon calculating average mean and average variance values of said two or more sub-blocks; and,
  means for recalculating the pixel video value at least for a first pixel disposed proximal to the boundary, said recalculating means being capable of utilizing at least the pixel video value of a second pixel being disposed proximal to the first pixel, said recalculating means being capable of recalculating in response to the predetermined condition being satisfied;
  wherein the average variance values are approximated using a piece-wise linear estimate.

18. An apparatus as claimed in claim 17, said means for determining whether a predetermined condition is satisfied including means for calculating an average variance and an average mean of the pixel video values for the respective pixels of each of the at least two or more sub-blocks, said determining means being capable of basing a determination upon at least a result of an average variance and average means calculation.

19. An apparatus as claimed in claim 17, said partitioning means, said determining means, and said recalculating means each comprising a circuit structure capable of implementing a respective function of said partitioning means, said determining means, and said recalculating means, respectively.

20. An apparatus as claimed in claim 17 wherein the piece-wise linear estimate involves converting negative variance values to positive variance values and utilizing the positive variance values to calculate average variance values.

21. A video system, comprising:
  means for reading a video;
  means for filtering the video so that blocking in the video is reduced; and
  means for displaying the video filtered by said filtering means on a display, said filtering means including:
  means for partitioning an image into at least two or more sub-blocks, each of the at least two or more sub-blocks containing a predetermined number of pixels wherein at least one boundary between the at least two or more sub-blocks is defined, each of the pixels having a pixel video value, respectively;
  means for determining whether a predetermined condition is satisfied wherein the predetermined condition is based upon calculating average mean and average variance values of said two or more sub-blocks; and
  means for recalculating the pixel video value at least for a first pixel disposed proximal to the boundary, said recalculating means being capable of utilizing at least the pixel video value of a second pixel being disposed proximal to the first pixel, said recalculating means being capable of recalculating in response to the predetermined condition being satisfied,
  wherein the average variance values are approximated using a piece-wise linear estimate.

22. A video system as claimed in claim 21 wherein the piece-wise linear estimate involves converting negative variance values to positive variance values and utilizing the positive variance values to calculate average variance values.

23. A video system as claimed in claim 21, each of said reading means, said filtering means, and said displaying means comprising a circuit capable of carrying out a corresponding function of said reading means, said filtering means, and said displaying means, respectively.

* * * * *

UNITED STATES PATENT AND TRADEMARK OFFICE
CERTIFICATE OF CORRECTION

PATENT NO. : 6,973,221 B1 Page 1 of 1
APPLICATION NO. : 09/460965
DATED : December 06, 2005
INVENTOR(S) : Ning Xue It is certified that error appears in the above-identified patent and that said Letters Patent is hereby corrected as shown below:

On the title page:

item 75 - Please add inventor "Darren Neuman"

item 12 - Please delete "Xue" and add --Xue et al.--

Signed and Sealed this

Twelfth Day of September, 2006

JON W. DUDAS
*Director of the United States Patent and Trademark Office*